United States Patent
Kikuchi et al.

(10) Patent No.: US 6,952,327 B1
(45) Date of Patent: Oct. 4, 2005

(54) DISK CARTRIDGE AND MANUFACTURING METHOD THEREOF

(75) Inventors: Shuichi Kikuchi, Miyagi (JP); Daiki Kobayashi, Miyagi (JP); Kenji Ogisu, Miyagi (JP)

(73) Assignee: Sony Corporation, Tokyo (JP)

( * ) Notice: Subject to any disclaimer, the term of this patent is extended or adjusted under 35 U.S.C. 154(b) by 1151 days.

(21) Appl. No.: 08/944,208

(22) Filed: Oct. 6, 1997

(30) Foreign Application Priority Data

Oct. 7, 1996 (JP) .............................................. 8-286045

(51) Int. Cl.[7] .............................................. G11B 23/02
(52) U.S. Cl. ...................... 360/133; 369/288; 428/35.7
(58) Field of Search ................................. 369/291, 288; 360/132, 137, 133; 528/125, 66; 428/35.7

(56) References Cited

U.S. PATENT DOCUMENTS

| 5,096,995 | A | * | 3/1992 | Fukumoto et al. | 528/125 |
| 5,106,912 | A | * | 4/1992 | Yamamoto et al. | 525/212 |
| 5,302,647 | A | * | 4/1994 | Suzuki et al. | 524/141 |
| 5,317,467 | A | | 5/1994 | Kato et al. | 360/133 |
| 5,342,889 | A | | 8/1994 | Sullivan et al. | 525/127 |
| 5,432,662 | A | * | 7/1995 | Kato et al. | 360/133 |
| 5,500,478 | A | * | 3/1996 | Fukumoto et al. | 525/66 |
| 5,886,097 | A | * | 3/1999 | Fukumoto et al. | 525/66 |

* cited by examiner

Primary Examiner—Dung C. Dinh
Assistant Examiner—T. Kupstas
(74) Attorney, Agent, or Firm—Frommer Lawrence & Haug LLP; William S. Frommer

(57) ABSTRACT

A disk cartridge in which a disk is loaded is formed with composite synthetic resin including at least two types of thermoplastic resin, an anti-static polymer, and an inorganic filler, heat-deforming temperatures of at least two types of the thermoplastic resin mutually differing.

The disk cartridge is provided by a method comprising the steps of mixing at least two types of thermoplastic resin to provide a mixture, heat-deforming temperatures of at least two types of the thermoplastic resin mutually differing, mixing an inorganic filler with a mixture of at least two types of the thermoplastic resin, mixing an anti-static polymer with the mixture of at least two types of the thermoplastic resin including the inorganic filler to provide a composite synthetic resin, injection molding the composite synthetic resin to provide component parts of the disk cartridge, and assembling the component parts to form the disk cartridge with the disk loaded therein.

5 Claims, 3 Drawing Sheets

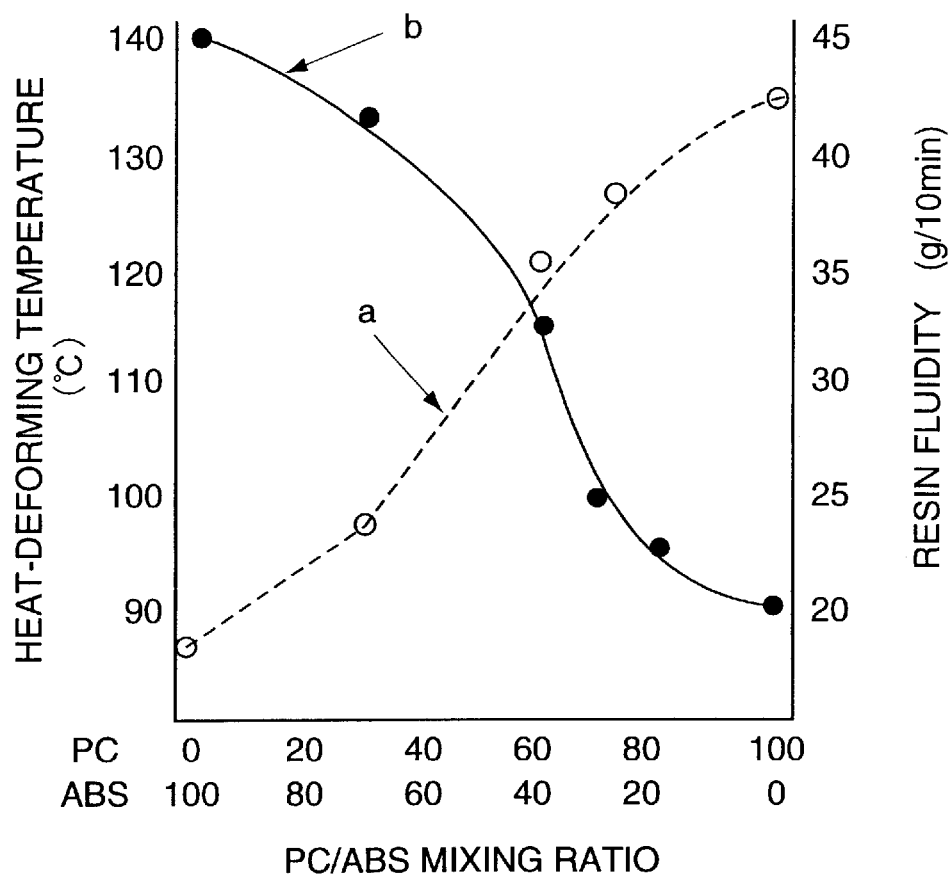

MIXING RATIO OF SYNTHETIC RESIN AND INORGANIC FILLER
(PART BY VOLUME)

| ANTI-STATIC POLYMER MIXING RATIO (PART BY WEIGHT) | VOLUME RESISTIVITY ($\Omega \cdot cm$) |
|---|---|
| 0 | $10^{16}$ |
| 3 | $2 \times 10^{13}$ |
| 5 | $8 \times 10^{12}$ |
| 7 | $1.1 \times 10^{12}$ |

DISK CARTRIDGE AND MANUFACTURING METHOD THEREOF

BACKGROUND OF THE INVENTION

The present invention relates to a disk cartridge in which such a disk as an optical disk and an optical magnetic disk is rotatably mounted which can reproduce and/or record data.

The disk cartridge loaded with the disk mentioned above is used widely as an external recording medium for audio devices or computers. Such a disk cartridge comprises an upper half and a lower half that are made of synthetic resin and coupled to each other. In other words, a weld rib provided at the tip of a coupling projection of the upper half is pressed against the tip of a coupling recess of the lower half, then fused by ultrasonic waves, so that the coupling projection is welded to the coupling recess to couple the upper half to the lower half. Both upper and lower halves are molded with injected thermoplastic resin such as polycarbonate with high heat-resistance and high rigidity.

The upper and lower halves of a conventional disk cartridge has the following problems.

The surfaces of both the upper and lower halves made of single thermoplastic resin are generally coated with an anion surface active agent or a polar polymer anti-static agent for the purpose of preventing the surfaces of the upper and lower halves from static electrification that causes accumulation of dust which reduces the reliability of the disk cartridge in recording/reproducing of data when the disk cartridge is used. However, the anti-static property of the upper and lower halves is reduced with time, since the surface active agent or the anti-static agent is just coated on the surfaces. Thus, it is difficult to keep the anti-static property on the surfaces of the upper and lower halves for a long time.

To solve this problem, therefore, a thermoplastic resin is mixed with an anti-static polymer material and the mixed composition is injection molded to obtain anti-static upper and lower halves. When mixing PC (polycarbonate) resin, a high heat-resistant thermoplastic resin, with the anti-static polymer material in uniform, however, the mixing must be done at high temperatures, so that such a problem is caused that the polymer material loses the anti-static property.

The use of low heat-resistant thermoplastic resin may solve this problem, but this will also cause another problem. When the disk cartridge thus comprising upper and lower halves is left in a car parked under a burning sun in summer and is kept to be subjected to such a high temperatures that is said to reach up to around 95° C., the upper and lower halves are sometimes deformed, and accordingly, the disk cannot be used normally any longer.

Furthermore, since the object disk unit is made thin in thickness, the upper and lower halves of the disk cartridge must also be thinned in wall thickness. However, unless the thermoplastic resin in use flows well in its injection molding, the molding accuracy of the upper and lower halves is lowered and in some cases, the injection-molding itself is disabled. Furthermore, when there is any residual distortion in the upper and lower halves after the injection-molding, in the disk cartridge comprising the upper and lower halves and being kept to be subjected to high temperatures, there is a fear of a problem that the residual strain develops in relaxation to cause the upper and lower halves to be deformed to disable the normal use of the disk cartridge.

Under such circumstances, it is an object of the present invention to solve the problems mentioned above and to provide a disk cartridge excellent in heat-resistance, rigidity, and anti-static properties.

SUMMARY OF THE INVENTION

In order to achieve the above object of the present invention, the disk cartridge loaded with a disk is formed with composite synthetic resin obtained by mixing at least two types of thermoplastic resin with an anti-static polymer and an inorganic filler, heat-deforming temperatures of at least two types of the thermoplastic resin mutually differing.

The above object of the present invention is also achieved by providing a method of manufacturing a disk cartridge loaded with a disk comprising the steps of mixing at least two types of thermoplastic resin to provide a mixture, heat-deforming temperatures of at least two types of the thermoplastic resin mutually differing, mixing an inorganic filler with a mixture of at least two types of the thermoplastic resin, mixing an anti-static polymer with the mixture of at least two types of the thermoplastic resin including the inorganic filler to provide a composite synthetic resin, injection molding the composite synthetic resin to provide component parts of the disk cartridge, and assembling the component parts to form the disk cartridge with the disk loaded therein.

According to the disk cartridge and the manufacturing method thereof described above, use of two types of thermoplastic resin, each having a heat-deforming temperature different from the other, enables to mix the two types of resin with anti-static polymer in a stable range of temperatures lower than the decomposition temperature of the polymer. Furthermore, thermoplastic resin mixed with inorganic filler can improve strength of the disk cartridge.

BRIEF DESCRIPTION OF THE DRAWINGS

FIG. 2 is a graph showing a relationship between mixing ratio and heat-deforming temperature with a characteristic curve a and a relationship between mixing ratio and resin fluidity with a characteristic curve b, in which the horizontal axis indicates the mixing ratio (part by weight) of PC resin to ABS resin, the left vertical axis indicates the heat-deforming temperature (° C.) and the right vertical axis indicates the resin fluidity (g/10 min).

FIG. 3 is a table showing changes of the flexural modulus ($kg/cm^2$) caused by the mixing ratio (part by weight) of PC resin to ABS resin.

DETAILED DESCRIPTION OF THE PREFERRED EMBODIMENTS

Hereunder, preferred embodiments of this invention will be described in detail with reference to attached drawings.

The embodiments to be described below are preferred ones according to the present invention with various technical restrictions applied thereto. The scope of the present invention, however, is not limited to the embodiments unless otherwise described.

Figure 1:
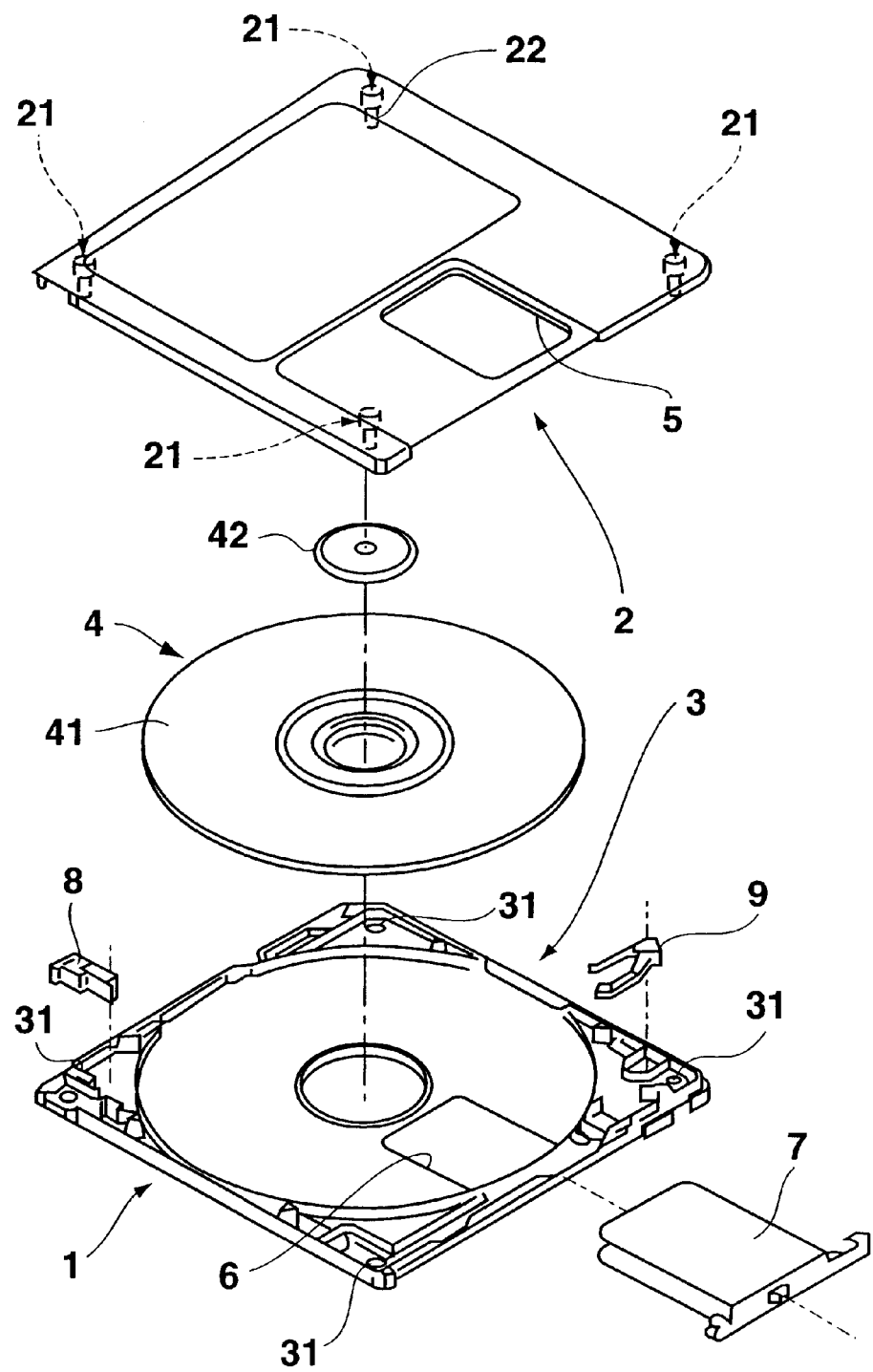
FIG. 1 is an exploded perspective view of a disk cartridge according to an embodiment of the present invention.

FIG. 1 is an exploded perspective view of a disk cartridge according to an embodiment of the present invention. In this disk cartridge 1, a disk 4 of an optical disk or a magnet-optical disk is rotatably mounted between an upper half 2 and a lower half 3 both made of synthetic resin with the upper and lower halves coupled. A sliding shutter 7 is provided to the disk cartridge for being used to open/close both the opening 5 provided to the upper half 2 and the opening 6 provided to the lower half 3.

Between the upper and lower halves 2 and 3 are disposed a safety member 8 slidably provided for preventing accidental erasure and a shutter locking member 9 provided at a position where the openings 5 and 6 are closed for being used to lock the shutter 7.

In the center of a disk substrate 41 on which a signal recording surface of the disk 4 is provided, a magnetized metallic hub 42 is attached for being used to make the disk unit chuck the disk 4 with magnetic force.

When coupling the upper and lower halves 2 and 3, the weld rib 22 provided at the tip of the coupling projection 21 of the upper half 2 is pressed against the coupling recess 31 of the lower half 3, then the coupling projection 21 is fused by ultrasonic waves, which results in welding of the coupling projection 21 and the coupling recess 31.

The upper and lower halves 2 and 3 of this disk cartridge 1 are formed with composite synthetic resin obtained by mixing at least two types of thermoplastic resin, each type thermoplastic resin having a heat-deforming temperature different from the other (measured according to ASTMD648 with 18.6 kg load), with anti-static polymer and inorganic filler.

Hereunder, the reason why the upper and lower halves 2 and 3 of this disk cartridge 1 have compositions as described above will be explained.

At first, the reason for using at least two types of thermoplastic resin, each type thermoplastic resin having a heat-deforming temperature different from the other, is to enable the thermoplastic resin and anti-static polymer to be mixed under temperatures at which the anti-static property of the polymer is not lost and to enable the thermoplastic resin to keep the required heat-resistant property.

For example, when using two types of thermoplastic resin, each type thermoplastic resin having a heat-deforming temperature different from the other, PC resin (polycarbonate) with heat-deforming temperature of 135° C. is used as a material of the first component with high heat-deforming temperature and ABS (acrylic butylene styrene) resin with heat-deforming temperature is 86° C. is used as a material of the second component with lower heat-deforming temperature.

Then, how the mixing ratio of the first component PC resin to the second component ABS resin would affect physical properties of the mixture was studied.

FIG. 2 is a graph showing a relationship between mixing ratio and heat-deforming temperature with a characteristic curve a and a relationship between mixing ratio and resin fluidity with a characteristic curve b, in which the horizontal axis indicates the mixing ratio (part by weight) of PC resin to ABS resin, the left vertical axis indicates the heat-deforming temperature (° C.), and the right vertical axis indicates the resin fluidity (g/10 min).

As is apparent from this figure, for ensuring a heat-deforming temperature of, for example, 95° C. or over, which is assumed as the measure of heat-resistance, the mixing ratio of PC resin to ABS resin must be 30 parts by weight or over. Furthermore, to ensure a resin fluidity of 25 g/10 min or over, which is assumed as the measure of molding property, the mixing ratio of PC resin to ABS resin must be 70 parts by weight or under.

As described above, the mixing ratio of the first component PC resin to the second component ABS resin should be adjusted to be 30 to 70 parts by weight per 100 parts by weight of the mixed resin in order to be able to mix two types of thermoplastic resin with anti-static polymer under temperatures at which the anti-static property of the polymer is not lost, as well as to keep the required heat resistance of the thermoplastic resin, and furthermore, to heighten the accuracy of injection molding of the thermoplastic resin and to provide such molding properties that do not leave any residual strain. When taking a variation of the mixing ratio into consideration, the above mixing ratio should preferably be between 40 and 60 parts by weight.

The second component resin to be mixed with the first component PC resin may be not only ABS resin but also another resin having a fusion temperature lower than that of PC resin and compatibility with PC resin. For example, PBT (polybutylene terephthalate) resin may be used. In addition to the PC resin, the first component resin may also be PPO (polyphenylene oxide) resin with the second component resin to be mixed with the PPC resin being a material obtained by blending or modification of PS (polystyrene) resin.

The reason for using the inorganic filler is that the inorganic filler is excellent in heat resistance and mixing property, and furthermore, it is able to make the PC resin/ABS resin alloy keep the required flexural modulus. The PC resin/ABS resin alloy described above has a lower flexural modulus than a single material of PC resin or ABS resin as shown in FIG. 3. This will cause deformation of the disk cartridge 1 made of a PC resin/ABS resin alloy and/or separation of the upper half 2 from the lower half 3 when an unexpected force is applied to the disk cartridge 1. The problem is avoided by the use of such inorganic filler.

For example, barium sulfate is used as such inorganic filler.

Then, how the mixing ratio of the PC/ABS resin alloy to barium sulfate would affect physical properties of the mixture was studied.

Figures 4, 5:
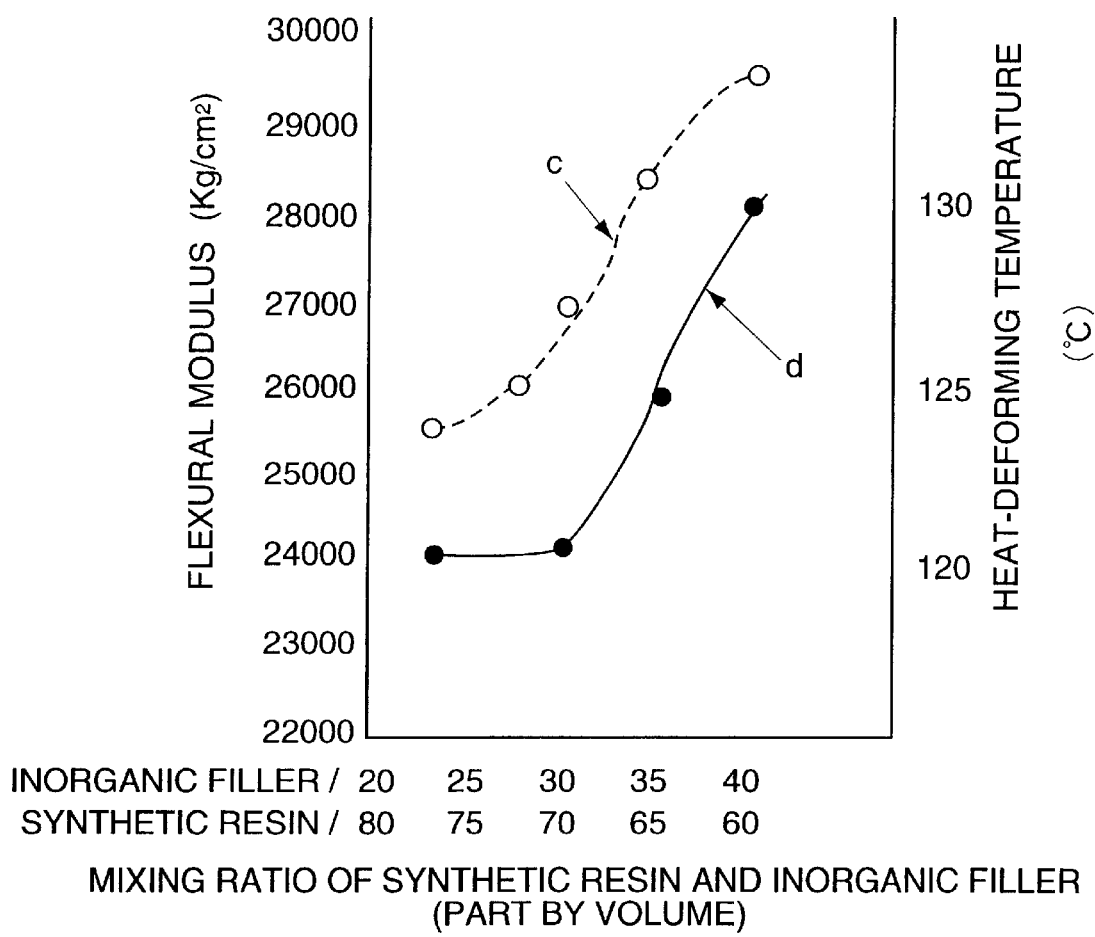
FIG. 4 is a graph showing a relationship between mixing ratio and flexural modulus with a characteristic curve c and a relationship between mixing ratio and heat-deforming temperature with characteristic curve d, in which the horizontal axis indicates the mixing ratio (part by volume) of a PC resin/ABS resin alloy to barium sulfate and the left vertical axis indicates the flexural modulus ($kg/cm^2$) and the right vertical axis indicates the heat-deforming temperature (° C.).
FIG. 5 is a table showing changes of the volume resistivity (ohms.cm) by the mixing ratio (part by weight) of anti-static polymer containing polyether ester-amide as the basic composition to a mixture of PC resin/ABS resin alloy and barium sulfate.

FIG. 4 is a graph showing a relationship between mixing ratio of the PC resin/ABS resin alloy and flexural modulus with a characteristic curve c and a relationship between the mixing ratio and heat-deforming temperature with a characteristic curve d. The horizontal axis indicates the mixing ratio (part by volume) of the PC resin/ABS resin alloy to barium sulfate, the left vertical axis indicates the flexural modulus ($kg/cm^2$), and the right vertical axis indicates the heat-deforming temperature (° C.).

As is apparent from FIG. 4, as the mixing ratio of barium sulfate to the PC resin/ABS resin alloy is increased, the flexural modulus can be linearly improved. For example, about 20 parts by volume or over of the mixing ratio of barium sulfate to the PC resin/ABS resin alloy can improve the flexural modulus by about 9% higher than the PC resin/ABS resin alloy containing no barium sulfate. Furthermore, with the mixing ratio of barium sulfate to the PC resin/ABS resin alloy being about 30 parts by volume or over, the heat-deforming temperature can further be increased higher than the PC resin/ABS resin alloy containing no barium sulfate to improve heat resistance.

In addition to barium sulfate, calcium carbonate, aluminum borate, titanium oxide, and zinc oxide can be used as an inorganic filler.

Although the disk cartridge 1 is not used usually in a high temperature atmosphere, when it is left in a car parked under a burning sun in midsummer, it sometimes will be deformed and disabled for normal operations due to a combined action of the raised temperature in the car and the radiant heat by the direct sunlight. In consideration of this, an examination was carried out in which a disk cartridge 1 made with a white inorganic filler and a disk cartridge 1 made with a black inorganic filler were left under the same conditions in a car under the burning sun in midsummer with its doors closed and the surface temperatures of the two types of disk cartridges were measured. As a result, the raised temperature of the white disk cartridge 1 was 95° C. or under, but then raised temperature of the black disk cartridge 1 was 105 to 110° C. This result shows clearly that when a white inorganic filler is used for the disk cartridge 1, the practical heat resistance can be improved by about 10 to 15° C. or over.

Finally, it was studied how the mixing ratio of anti-static polymer (part by weight) to the mixture of PC/ABS resin alloy and barium sulfate would affect the suppressing effect of electrification. For example, as anti-static polymer, anti-static polymer containing polyether ester-amide as the basic composition is used. An anti-static effect, that is, a suppressing effect of electrification is generally in close relation to the volume resistivity (ohms.cm). When the volume resistivity is low, the suppressing effect of electrification becomes high. Thus, as is apparent from FIG. 5, when the mixing ratio of anti-static polymer containing polyether ester-amide as the basic composition to the mixture of PC resin/ABS resin alloy and barium sulfate is increased, the volume resistivity can be lowered, that is, the suppressing effect of electrification can be improved.

The mixture, in which anti-static polymer containing polyether ester-amide as the basic composition, barium sulfate, and a PC resin/ABS resin alloy are mixed, does not affect the above mentioned physical properties of the mixture at all.

When using polymer containing polyether ester-amide as the basic composition as anti-static polymer, zinc oxide should not be used as inorganic filler. This is because the compatibility of the PC resin/ABS resin alloy becomes too high due to ester exchange catalytic action of the zinc oxide and accordingly the anti-static property of polyether ester-amide is prevented.

When the disk cartridge 1 is manufactured with such a composition, PC resin and ABS resin are mixed with 60 parts by weight: 40 parts by weight, then 40 parts by volume of barium sulfate is mixed in 100 parts by volume of part the PC resin/ABS resin alloy. After this, the mixture of the PC resin/ABS resin alloy and the barium sulfate, and the anti-static polymer containing polyether ester-amide as the basic composition are dry-mixed using a tumbler with 93 parts by weight: 7 parts by weight, then this mixture is fused and mixed into pallets using a twin-screw extruder. Then, this mixture is injected from the injection molding press to be formed into the upper and lower halves 2 and 3.

The disk cartridge 1 thus manufactured has a higher heat resistance than the disk cartridge made of an ordinary material together with an effect for preventing radiant heat. Therefore, deformation and other damages can be avoided even when it is left under high temperatures, for example, in a car parked under a burning sun in midsummer. Furthermore, high rigidity of the disk cartridge 1 can protect the disk mounted therein even from an unexpectedly applied external force. Furthermore, anti-static property of the disk cartridge 1 that can be kept for a long time can protect the disk cartridge 1 from accumulation of dust and other foreign matters even when it is used for a long time. Thus, the reliability of the disk cartridge 1 is improved significantly. In addition, the mixed resin can keep its fluidity even at low temperatures, so that the temperature of the dies can be lowered to shorten the cooling time in injection molding, which improves the productivity significantly.

As described above, the present invention can provide a disk cartridge excellent in heat resistance, rigidity, and anti-static property.

What is claimed is:

1. A disk cartridge, loaded with a disk, wherein said cartridge is made from a composite synthetic resin consisting of:

at least two types of thermoplastic resin;

an antistatic polymer; and an inorganic filler, wherein the first thermoplastic resin is a high heat-resistant resin having a heat-deforming temperature higher then a desired heat-deforming temperature and the second thermoplastic resin is a low heat-resistant resin having a heat deforming temperature lower than said heat-deforming temperature; and wherein the mixing ratio between the first resin and the second resin is between 40 and 60 parts by weight, the filler is barium sulfate, calcium carbonate, aluminum borate or titanium oxide and the anti-static polymer is polyether ester-amide.

2. A disk cartridge as claimed in claim 1, wherein said first thermoplastic resin is PC (polycarbonate) resin and said second thermoplastic resin is ABS (acrylic butylene styrene) resin, and a mixing ratio of said first component to said second component is 30 to 70 parts by weight.

3. A disk cartridge as defined in claim 1, wherein said inorganic filler as white color.

4. A disk cartridge as claimed in claim 2, wherein the amount of filler is at least about 20 parts by volume.

5. A disk cartridge as claimed in claim 4 wherein the inorganic filler is barium sulfate, calcium carbonate, aluminum borate, titanium oxide or zinc oxide.

* * * * *